United States Patent Office 2,830,991
Patented Apr. 15, 1958

2,830,991

PRODUCTS OF THE AMINO-PIPERIDINE-2-6-DIONE SERIES

Herbert Keller, Beuel, near Bonn, and Willi Kunz, Braunschweig, Germany, assignors to Chemie Grünenthal G. m. b. H., Stolberg, Rhineland, Germany No Drawing. Application May 16, 1955
Serial No. 508,828

Claims priority, application Germany May 17, 1954

6 Claims. (Cl. 260—281)

The present invention relates to new products of the amino-piperidine-2,6-dione series.

The new products of the invention have the general formula

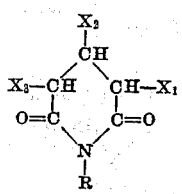

wherein R represents a member of the group consisting of hydrogen, the aliphatic radicals containing 1 to 6 carbon atoms, the phenyl and the benzyl radicals, at least one X represents a member of the group consisting of the alkylated amino groups, the alkyl radicals of which contain 1 to 3 carbon atoms, and the radicals of the imides of the dicarboxylic acids, the other X's representing members of the group consisting of hydrogen and the alkyl radicals.

The aliphatic radicals of the substituent R may be saturated or unsaturated aliphatic radicals with 1 to 6 carbon atoms and the chain of carbon atoms may be interrupted by hetero atoms such as nitrogen, oxygen or sulphur. The aliphatic radicals may be substituted by any suitable substituent. Preferred substituents in the aliphatic radicals are halogen groups, hydroxy groups and substituted amino groups. When R stands for a phenyl or benzyl radical, these radicals may also be substituted. If one X stands for an amino group substituted by alkyl radicals having 1 to 3 carbon atoms, these alkyl radicals may be substituted by halogen, amino or hydroxyl groups. The imides of dicarboxylic acids may be imides of dicarboxylic acids of the aliphatic, cycloaliphatic, aromatic or heterocyclic series. It is advantageous to employ the imides of phthalic acid and succinic acid.

According to one preferred form of the present invention, $X_1$ stands for the phthalimide radical, $X_2$ and $X_3$ for hydrogen atoms and R for an aliphatic radical with 1 to 6 carbon atoms, a phenyl radical or a benzyl radical.

The products of the invention possess valuable therapeutic properties. They cause a strongly pronounced lowering of the motility, i. e., the phenomenon of motion, and have a very low toxicity. They may be generally employed for "central attenuation" (vegetative dystonia). The products of the invention do not have any peripherally paralysing curare-like effects. In addition, the compounds have certain spasmolytic and antihistaminic effects. Dispensed in larger quantities, the products of the invention, and particularly 3-phthalimido-2,6-dioxopiperidine are effective as soporifics. The products are fully effective, both when used parenterally or orally.

The new products may be produced by reacting an aliphatic dicarboxylic acid, which contains 5 C-atoms in a straight chain and the methylene groups of which are substituted by the substituents $X_1$—$X_3$ in accordance with the aforementioned general formula, with urea or substitution products thereof or with a primary amine or an acid amide in such manner that water is split off and the ring is closed. If an amino group is present in the aliphatic chain, this group must not exist in free form in this stage of the process, since otherwise there is the danger of this amino group participating in an undesirable manner in the reaction. Instead of using the dicarboxylic acid, it is also possible to employ functional derivatives thereof, such as acid halides, acid esters and acid amides.

Compounds of the glutaminic acid series may with particular advantage be used as initial components for the present invention. In this case also, the acid halides, esters and amides of glutaminic acid may be employed instead of the acid itself. It is known that glutaminic acids tends to form 5-rings with a free amino group. This reaction is undesirable for the purposes of the present invention. The amino group must therefore be substituted or protected prior to the ring-closing reaction. The protection of the amino group may be carried out, when using products of the glutaminic acid series, by introducing the phthalyl, succinyl or like radical in a manner known per se. The proportions of the components used for the ring formation must be such that at least 1 mol of the compound yielding the imide nitrogen is used to one mol of the glutaminic acid component.

The invention is illustrated by the following examples:

*Example 1*

27.7 g. of N-phthalyl glutaminic acid are mixed with 66 g. of a 33% solution of ethyl amine in water and slowly heated in an oil bath to 160–180° C., the mixture being maintained at this temperature for 15 to 20 minutes. The reaction product is recrystallised from alcohol by fractionation. It melts at 209° C. The DL 50 (50% lethal dose) is higher than 120 mg./20 g. of mouse, while the therapeutic dose is 10 mg./20 g. of mouse.

*Example 2*

28.5 g. of N-succinyl-glutaminic acid diethyl ester are heated for 30 minutes to 140–150° C. with 70 g. of propyl amine with addition of 5 g. of sodium methylate. The product is purified as in Example 1 by fractional crystallisation.

*Example 3*

26 g. of N-phthalyl glutaminic acid anhydride are melted with 12 g. of urea in an oil bath at 170–180° C. until the reaction is completed, which takes about 20 minutes. The reaction takes place with violent evolution of carbon dioxide and ammonia. After cooling, the reaction product is recrystallised by fractionation from 95% alcohol, and the first fraction may contain phthalic acid derivatives. The required product melts at 269–271° C. The substance is soluble in hot alcohol and in dimethyl formamide: it is also soluble in strong lyes, the solutions obtained having a yellowish colour. The yield is about 65–70% of the theoretical.

*Example 4*

Dry gaseous ammonia is introduced at about 180° C. into 13 g. of molten N-phthalyl glutaminic acid anhydride which is disposed in a loosely closed vessel, the process being so regulated that the water being formed is distilled off. A white substance simultaneously sublimes from the reaction mixture. After being cooled, the melt is worked up as in Example 3. The product which is obtained melts at 269–271° C.

Example 5

13 g. of N-phthalyl glutaminic acid anhydride are melted with 21.2 g. of symmetrical diphenyl urea at 170–180° C. in an oil bath. The evolution of gas has practically been completed after about 20 minutes. After cooling, the aniline which is formed is first of all separated with a little ether. By fractional crystallisation from 95% alcohol, there are obtained a small amount of unchanged diphenyl urea, possibly phthalic acid derivatives, while the main quantity consists of $N_3$-phthalyl glutaminic acid-N-phenyl imide with a melting point of 187° C.

Example 6

If gaseous ammonia is passed into phthalyl glutaminic acid in an autoclave and if the latter is heated for a short time to 140–160° C., it is possible to isolate 3-phthalimido-2,6-dioxopiperidine. After recrystallisation by fractionation from 95% alcohol, the product melts at 269–271° C.

Example 7

13 g. of N-phthalyl glutaminic acid anhydride are melted with 6 g. of benzyl amine at 180° C. for 15 minutes in an oil bath. After cooling, the reaction mixture is worked up by fractional crystallisation from 95% alcohol. N-phthalyl glutaminic acid-N-benzyl imide is obtained with the melting point of 104–108° C.

Example 8

13 g. of N-phthalyl glutaminic acid anhydride are suspended in 100 cc. of absolute xylene and mixed with a solution of 6.4 g. of benzyl amine in 50 cc. of absolute xylene. This mixture is boiled under reflux for 4 hours on an oil bath. The xylene is then evaporated in vacuo and the residue recrystallised from 95% alcohol. The melting point of the product obtained is 104–108° C. and the yield about 80% of the theoretical.

Example 9

The procedure indicated in Example 8 is followed, using 13.85 g. of N-phthalyl glutaminic acid.

Example 10

13 g. of phthalyl glutaminic acid anhydride and 6 g. of urea are heated to boiling point in 75 cc. of absolute xylene for 4 hours in an oil bath. Formation of a sublimate takes place with evolution of ammonia and carbon dioxide. The xylene is then distilled off in vacuo and the residue recrystallized from 95% alcohol by fractionation. In addition to some phthalimide and phthalyl glutamin, the required $N_3$-phthalyl glutaminic acid imide is obtained, having a melting point of 269–271° C.

Example 11

The procedure is as in Example 10, but 14 g. of phthalyl glutaminic acid are used instead of phthalyl glutaminic acid anhydride.

Example 12

The procedure is as in Example 10, but 7.6 g. of thiourea are used instead of urea.

Example 13

The procedure is as in Example 12, but using 14 g. of phthalyl glutaminic acid instead of phthalyl glutaminic acid anhydride.

Example 14

13 g. of phthalyl glutaminic acid anhydride and 5.7 g. of allyl amine are heated in an oil bath to 175° C. and maintained at this temperature for about 15 minutes. After cooling, the reaction product is recrystallized by fractionation from aqueous alcohol. The product obtained melts at 164–167° C.

What we claim is:

1. As a new composition of matter, a compound of the following structural formula:

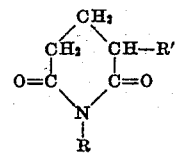

wherein R is selected from the group consisting of hydrogen, aliphatic radicals of 1–6 carbon atoms, the phenyl radical, and the benzyl radical; and wherein R' is selected from the group consisting of the phthalimido radical and the succinimido radical.

2. As a new composition of matter, 3-phthalimido-2,6-dioxo-1-ethyl piperidine having a melting point of about 209° C.

3. As a new composition of matter, 3-phthalimido-2,6-dioxo-1-phenyl piperidine having a melting point of about 187° C.

4. As a new composition of matter, 3-phthalimido-2,6-dioxo-1-benzyl piperidine having a melting point of about 104–108° C.

5. As a new composition of matter, 3-phthalimido-2,6-dioxo-1-allyl piperidine having a melting point of about 164–167° C.

6. As a new product the 3-phthalimido-2.6-dioxo-piperidine being a good soporific and melting at 269–271° C.

No references cited.